Figure 1:
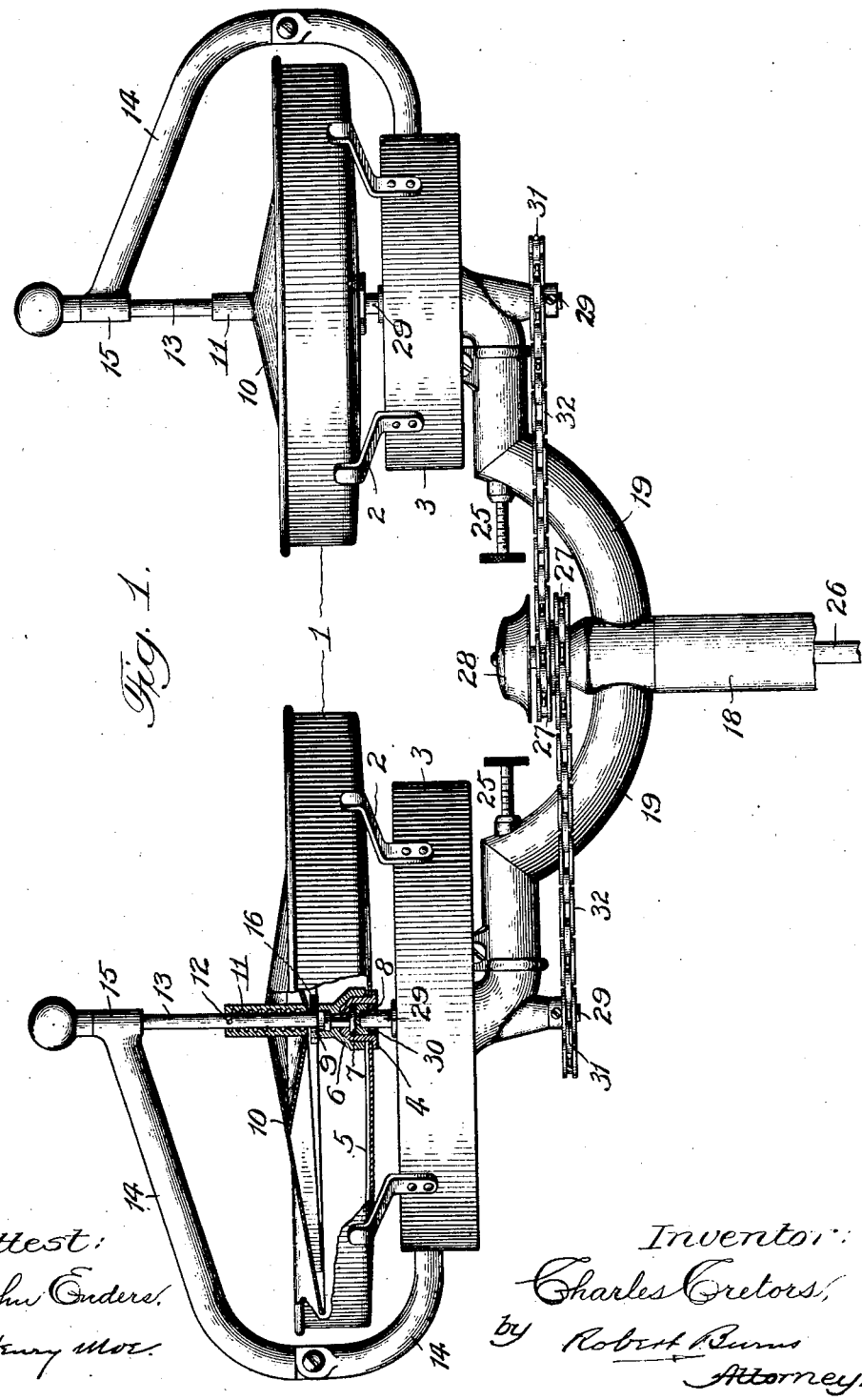

No. 862,964. PATENTED AUG. 13, 1907.
C. CRETORS.
CORN POPPING APPARATUS.
APPLICATION FILED DEC. 27, 1906.
2 SHEETS—SHEET 2.
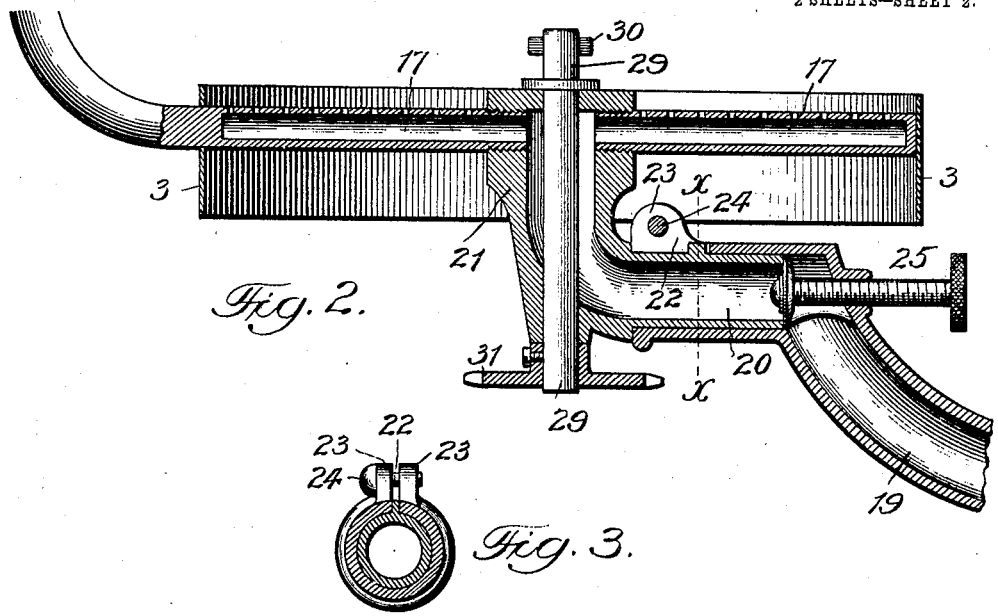
Fig. 2.
Fig. 3.
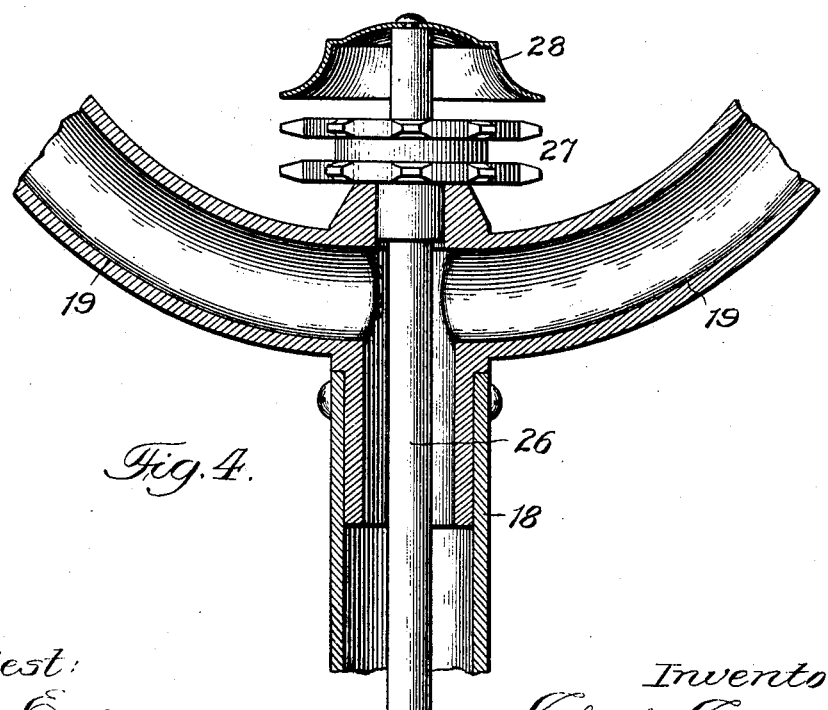
Fig. 4.
Attest:
John Enders
Henry Moe
Inventor:
Charles Cretors,
by Robert Burns
Attorney

UNITED STATES PATENT OFFICE.

CHARLES CRETORS, OF CHICAGO, ILLINOIS.

CORN-POPPING APPARATUS.

No. 862,964.      Specification of Letters Patent.      Patented Aug. 13, 1907.

Application filed December 27, 1906. Serial No. 349,722.

*To all whom it may concern:*

Be it known that I, CHARLES CRETORS, a citizen of the United States of America, and a resident of Chicago, in the county of Cook and State of Illinois, have invented certain new and useful Improvements in Corn-Popping Apparatus, of which the following is a specification.

This invention relates to the type of corn popping apparatus which forms the subject matter of my prior Letters Patent No. 728,550, issued May 19, 1903; and the present improvement has for its object to provide a simple and efficient structural arrangement and combination of parts adapted to afford an efficient under drive for the stirring means of the roaster pan or pans; a ready means for tightening the driving connections, and in connection therewith a simple and effective means for introducing a supply of gaseous fuel to the burners used in heating the roasting pans, all as will hereinafter more fully appear.

In the accompanying drawings:—Figure 1 is a side elevation, partly in section, illustrative of the general arrangement of the parts of the present improvement. Fig. 2, is an enlarged detail section of burner, gaseous fuel supply and driving spindle of the stirrer. Fig. 3, is a detail transverse section on line *x—x*, Fig. 2. Fig. 4, is an enlarged detail section of the central portion of the gaseous fuel supply and its accessories.

Similar numerals of reference indicate like parts in the different views.

Referring to the drawings, 1 are counterpart stationary open top roasting or popper pans removably supported by bracket arms 2, upon the circular inclosing rings or shells 3, of the gaseous fuel burners hereinafter described.

4 is a fixed thimble secured centrally to the bottom of each pan 1, to form bearings for the carrying hubs of the stirrer blades of the respective pans.

5 are the stirrer blades carried by a hub 6, of an inverted cup shape and adapted to fit over and have bearing upon the fixed thimble 4, as shown: Said hub is provided with a central stem portion 7, which extends down through the bore of the thimble 4, and is formed with transversely arranged notches 8 for operative engagement with the driving mechanism hereinafter described; said hub is also provided at its top with transversely arranged notches 9 for operative engagement with the hereinafter described shaft which carries the cover of the roaster pan.

10, is the pan cover of the same general form as in my patented construction aforesaid, and adapted to normally close the open top of a roaster pan 1. Such pan carries a centrally internally screw threaded hub 11, the screw threads of which are adapted to have operative engagement with a pin or stud 12 on a shaft arranged vertically above the roaster pan, as hereinafter more fully set forth; the automatic operation of said cover is the same as in my former patented construction.

13, is the vertical shaft above referred to, and which is carried by a bracket arm 14 fixedly attached at its lower end to the before described burner ring 3, and provided at its upper and overhanging end with a vertical sleeve 15 through which the aforesaid shaft 13 passes and is supported by a suitable enlargement on the upper end of said shaft. In the present invention said bracket is formed in two sections hinged together so as to permit the cover 10 being swung over to one side of the roaster pan, when free and unimpeded access to said pan is desired.

16, are lateral lugs on the lower end of the shaft 13, for operative connection with the transverse notches of the stirrer hub 6, in a readily detachable manner, to permit of the above described manipulation of the cover 10.

17 are a series of radially arranged perforated pipes constituting the individual burner for heating each respective roasting pan; such pipes are secured at their outer ends to the aforesaid ring or shell 3, and at their inner ends to the hollow supply head hereinafter described.

18 is a hollow post or tube extending up from the floor of the usual compartment in which the apparatus is arranged; such tube in the present improvement constitutes a portion of the conduit for the gaseous fuel supply of the burners, and to this end will be connected in any usual and suitable manner with the source of gaseous fuel supply. In addition to such use the said post or tube constitutes a housing for the primary driving shaft of the stirrer mechanisms as hereinafter more fully set forth.

19 are tubular branches in the post or tube 18; such branches extend in opposite directions from said tube, and are provided with horizontal extensions at their free ends as shown for the reception, in a horizontally adjustable manner, of the horizontal members 20, of the hollow heads 21 of the burners.

The hollow heads 21, above referred to, will each comprise, the aforesaid horizontal extension 20, and a vertical main portion to which the perforated burner pipes 17 before described, are rigidly attached.

In the present improvement the single post or tube 18 forms the sole supporting means for the different members of the apparatus, including the pair of burners, roasting pans, covers, and driving mechanisms hereinafter described, and so that the apparatus can be removed from its containing housing, as a whole, and in like manner replaced.

22, are horizontal slots in the free ends of the tubular branches 19, aforesaid, and 23 are lugs at the respective margins of said slots.

24, are clamping bolts passing through said lugs and adapted to clamp the free ends of the aforesaid tubular branches 19, upon the horizontal members 20 of the burner head 21 above described, to hold the parts at any desired horizontal adjustment and for the purpose hereinafter stated.

In the construction shown, the ends of the horizontal members 20, located within the branches 19 constitute valve seats, for the valves 25, by which the supply of gaseous fuel to the burners is regulated and controlled.

26, is the primary driving shaft, receiving motion from any suitable power source; such shaft is arranged in the interior of the tubular post 18, and in the present improvement is made to project through the upper end of said post to carry a pair of chain or sprocket wheels 27, and a superimposed cap or shield 28 to protect said sprocket from any descending material.

29 are secondary driving shafts passing vertically through the aforesaid hollow heads 21, and provided at their upper ends with lateral lugs 30, for engagement with the before described notches 8 in the carrying hubs of the stirrer blades; at their lower ends said secondary shafts carry chain or sprocket wheels 31 operatively connected to the chain or sprocket wheels 27 aforesaid by endless chains 32. By the horizontal adjustment of the heads 21 with relation to the branches 19, the application to, and the removal of the chains 32 from the sprocket wheels is readily attained, as well as the taking up of any slack in said chains.

Having thus fully described my said invention what I claim as new and desire to secure by Letters Patent, is:—

1. In a corn popping apparatus, the combination of a stationary open pan, a central fixed thimble in the bottom on said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft arranged above the pan and having lateral lugs on its lower end for detachable engagement with the notches at the upper end of the aforesaid hub, and a cover arranged in a vertically adjustable manner on said vertical shaft, substantially as set forth.

2. In a corn popping apparatus, the combination of a stationary open pan, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having lateral lugs on its lower end for detachable engagement with the notches at the upper end of the aforesaid hub, a stationary bracket having a hinged section formed with a bearing for said shaft, and a cover arranged in a vertically adjustable manner on said shaft, substantially as set forth.

3. In a corn popping apparatus, the combination of a gaseous fuel burner having an encircling shell, a stationary open top pan arranged above said burner, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having lateral lugs on its lower end for detachable engagement with the notches at the upper end of the aforesaid hub, a bracket attached to the encircling shell of the burner and formed with a bearing for said shaft, and a cover arranged in a vertically adjustable manner on said shaft, substantially as set forth.

4. In a corn popping apparatus, the combination of a gaseous fuel burner having an encircling shell, a stationary open top pan arranged above said burner, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having lateral lugs on its lower end for detachable engagement with the notches at the upper end of the aforesaid hub, a bracket attached to the encircling shell of the burner and having a hinged section formed with a bearing for said shaft, and a cover arranged in a vertically adjustable manner on said shaft, substantially as set forth.

5. In a corn popping apparatus, the combination of a stationary open pan, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft arranged above said pan and having a lateral pin intermediate its height and lateral lugs on its lower end for detachable engagement with the notches at the upper end of the aforesaid hub, and a cover having a central hub formed with an internally screw-threaded bore adapted for operative engagement with the lateral pin of the vertical shaft aforesaid, substantially as set forth.

6. In a corn popping apparatus, the combination of a stationary open pan, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having a lateral pin intermediate its height and lateral lugs on its lower end for detachable engagement with the notches at the upper end of the aforesaid hub, a stationary bracket having a hinged section formed with a bearing for said shaft, and a cover having a central hub formed with an internally screw-threaded bore adapted for operative engagement with the lateral pin of the vertical shaft aforesaid, substantially as set forth.

7. In a corn popping apparatus, the combination of a gaseous fuel burner having an encircling shell, a stationary open top pan arranged above said burner, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having a lateral pin intermediate its height and lateral lugs on its lower end for detachable engagement with the notches at the upper end of the aforesaid hub, a bracket attached to the encircling shell of the burner and formed with a bearing for said shaft, and a cover having a central hub formed with an internally screw-threaded bore adapted for operative engagement with the lateral pin of the vertical shaft aforesaid, substantially as set forth.

8. In a corn popping apparatus, the combination of a gaseous fuel burner having an encircling shell, a stationary open top pan arranged above said burner, a central fixed thimble in the bottom of said pan, a hub journaled on said thimble and provided with transversely arranged notches in its upper and lower ends, a series of stirrer blades carried by said hub, a driving shaft provided with lateral lugs for detachable engagement with the notches at the lower end of said hub, a vertical shaft having a lateral pin intermediate its height and lateral lugs on its lower end for detachable engagement with the notches at the upper end of the aforesaid hub, a bracket attached to the encircling shell of the burner and having a hinged section formed with a bearing for said shaft, and a cover having a central hub formed with an internally screw-threaded bore adapted for operative engagement with the lateral pin of the vertical shaft aforesaid, substantially as set forth.

9. In a corn popping apparatus, the combination of a set of gaseous fuel burners arranged in horizontal relation, stationary open top pans arranged above said burners, each pan having a fixed thimble on its bottom, hubs journaled on said thimbles and provided with transversely arranged notches in their lower ends, stirrer blades carried by said hubs, individual driving shafts provided with lateral lugs at their upper ends for detachable engagement with the notches at the lower ends of said hubs, sprocket wheels on the lower ends of said shafts, a central gaseous fuel supply tube having lateral branches connecting with the burners, a primary driving shaft having journal supports in said central tube and provided with sprocket wheels, and chains connecting said sprocket wheels with the sprocket wheels of the individual shafts aforesaid, substantially as set forth.

10. In a corn popping apparatus, the combination of a set of gaseous fuel burners arranged in horizontal relation, stationary open top pans arranged above said burners, each pan having a fixed thimble on its bottom, hubs journaled on said thimbles and provided with transversely arranged notches in their upper and lower ends, stirrer blades carried by said hubs, individual driving shafts provided with lateral lugs at their upper ends for detachable engagement with the notches at the lower ends of said hubs, sprocket wheels in the lower ends of said shafts, a central gaseous fuel supply tube having lateral branches connecting with the burners, a primary driving shaft having journal supports in said central tube and provided with sprocket wheels, chains connecting said sprocket wheels with the sprocket wheels of the individual shafts aforesaid, vertical shafts arranged above the pans and having lateral lugs on their lower ends for detachable engagement with the notches at the upper ends of the hubs aforesaid, and covers arranged in a vertically adjustable manner on said vertical shafts, substantially as set forth.

11. In a corn popping apparatus, the combination of a set of gaseous fuel burners arranged in horizontal relation, stationary open top pans arranged above said burners, each pan having a fixed thimble on its bottom, hubs journaled on said thimbles and provided with transversely arranged notches in their upper and lower ends, stirrer blades carrier by said hubs, individual driving shafts provided with lateral lugs at their upper ends for detachable engagement with the notches at the lower ends of said hubs, sprocket wheels on the lower ends of said shafts, a central gaseous fuel supply tube having lateral branches connecting with the burners, a primary driving shaft having journal supports in said central tube and provided with sprocket wheels, chains connecting said sprocket wheels with the sprocket wheels of the individual shafts aforesaid, vertical shafts having lateral lugs on their lower ends for detachable engagement with the notches at the upper ends of the hubs aforesaid, stationary brackets having hinged sections formed with supports for said shafts, and covers arranged in a vertically adjustable manner on said vertical shafts, substantially as set forth.

12. In a corn popping apparatus, the combination of a set of gaseous fuel burners arranged in horizontal relation and provided with encircling rings, stationary open pans arranged above said burners, each pan having a fixed thimble on its bottom, stirrer carrying hubs journaled on said thimbles and provided with transversely arranged notches in their lower ends, individual driving shafts provided with lateral lugs at their upper ends for detachable engagement with the notches at the lower ends of said hubs, sprocket wheels on the lower ends of said shafts, a central gaseous fuel supply tube having lateral branches carrying the burners in a horizontally adjustable manner, a primary driving shaft having journal supports in said central tube and provided with sprocket wheels, and chains connecting said sprocket wheels with the sprocket wheels of the individual shafts aforesaid, substantially as set forth.

Signed at Chicago, Illinois, this 19th day of December 1906.

CHARLES CRETORS.

Witnesses:
ROBERT BURNS,
HENRY MOE.